United States Patent [19]

Lautenschläger et al.

[11] Patent Number: 5,779,410

[45] Date of Patent: Jul. 14, 1998

[54] FASTENING DEVICE FOR MOUNTING HARDWARE ESPECIALLY CABINET HARDWARE ON CABINETS

[75] Inventors: Horst Lautenschläger; Gerhard Wilhelm Lautenschläger, both of Reinheim, Germany

[73] Assignee: MEPLA-Werke Lautenschlager GmbH & Co. KG, Germany

[21] Appl. No.: 596,994

[22] Filed: Feb. 5, 1996

[30] Foreign Application Priority Data

Feb. 17, 1995 [DE] Germany .................. 195 05 311.7

[51] Int. Cl.⁶ ............................................. F16B 13/04
[52] U.S. Cl. ........................... 411/33; 411/55; 411/59
[58] Field of Search ........................ 411/32, 33, 60, 411/55

[56] References Cited

U.S. PATENT DOCUMENTS

| | | | |
|---|---|---|---|
| 1,021,794 | 4/1912 | Pleister | 411/21 |
| 2,685,221 | 8/1954 | Barrett . | |
| 4,501,520 | 2/1985 | Bergner | 411/33 |
| 5,085,544 | 2/1992 | Gerhard | 411/33 |
| 5,246,322 | 9/1993 | Salice | 411/349 |
| 5,536,122 | 7/1996 | Weber | 411/33 |

FOREIGN PATENT DOCUMENTS

| | | | |
|---|---|---|---|
| 0270439 | 4/1969 | Austria . | |
| 0352333 | 3/1978 | Austria . | |
| 2515881 | 10/1976 | Germany | 411/33 |
| 9307086 | 8/1993 | Germany . | |

Primary Examiner—Steven N. Meyers
Assistant Examiner—Tuyet-Phuong Pham
Attorney, Agent, or Firm—Londa and Traub LLP

[57] ABSTRACT

A fastening plug for mounting furniture hardware having an expandable sleeve into which an elongated shaft of an expander enters, the shaft having a head for rotating the expander relative to the sleeve. The elongated shaft of the expander has multiple expansion sections along the length of the shaft and which taper in the direction of the protruding end of the shaft. The central bore of the sleeve which receives the elongated shaft of the expander, is shaped so as to complement the shaft, and the position of the complementary, tapering expansion sections of the shaft is varied relative to the complementary tapered central bore sections in the sleeve when the expander is rotated relative to the expansion sleeve.

6 Claims, 3 Drawing Sheets

FASTENING DEVICE FOR MOUNTING HARDWARE ESPECIALLY CABINET HARDWARE ON CABINETS

The invention relates to a fastening device for mounting hardware, especially cabinet hardware, on a surface by means of a plug similar to an expansion plug which can be introduced into a bore and which has an expansion sleeve into which an elongated shaft of an expander enters, which is provided on its end protruding from the expansion sleeve with means for rotating the expander relative to the expansion sleeve.

BACKGROUND OF THE INVENTION

For installing hardware, especially on furniture, the use of plugs provided on the hardware which are forced or inserted into associated bores in the area created for the purpose in the cabinet, and then expanded in the manner of an expansion plug, have become very popular because such kinds of fastening—at least in furniture made of the chip-board material which is being used increasingly of late—provides greater strength than a simple screw.

For example, it is known to mount cup-like recessed housings or mounting plates of modern cabinet hinges by means of such expansion-plug kinds of plugs, wherein the actual body to be introduced into the mounting bore is provided with external annular ribs of saw-tooth cross section which, when the sleeve is expanded by a screw driven into their central opening, are to dig into the wall of the bore (DE-OS 31 26 614). Instead of the expansion of the sleeve by driving a screw into the central opening, systems are known (Austrian Patent 270,439) in which the spreading of the thick-walled sleeve in the bore is performed by drawing a conical wedge into the bottom end of the hole running through the spreader sleeve by means of a screw engaged in a threaded bore in the spreader body. The known plugs must have relatively thick-walled spreader sleeves, so that the holes drilled for them must have a correspondingly large diameter. In order to spread them sufficiently the screws must be turned until the spread required for tight anchoring in the bore is achieved. Especially when manual screwdrivers must be used, this is laborious and the degree of spread and thus also the plugs' resistance to being drawn out of the bore is sometimes difficult to estimate.

The invention, however, is addressed to the problem of offering a fastening device for mounting hardware by means of plugs which can be introduced into mounting bores and expanded like an expansion plug, which can have a smaller diameter than the known plugs, and in which an absolutely firm seat can be achieved with substantially less effort.

SUMMARY OF THE INVENTION

Setting out from a fastening system of the kind mentioned above, this problem is solved by the invention in that the elongated shaft of the expander has a plurality of expansion sections conically tapering toward the mouth of the bore and arranged successively along the length of the shaft, that the central opening of the spreader sleeve receiving the shaft of the expander is shaped complementary to the shaft of the expander. Means are provided in the sleeve for varying the position of the tapered spreading sections of the shaft relative to the complementary conical central bore sections when the spreader is rotated relative to the expansion sleeve. On account of the longitudinally successive arrangement of a plurality of tapering expansion sections in the expansion sleeve, when the expander is rotated the sleeve is conically spread apart not only from one end, as in the known expansion plugs, but a uniform cylindrical expansion is produced over the entire length of the expansion sleeve, causing a uniform application of force to the expansion sleeve against the bore wall over its entire length, and thus a great ability to withstand stress is achieved. On account of the uniform application of the expanding force over the length of the sleeve, the latter can also be made with thinner walls than conventional expansion plugs, permitting a reduction of the diameter.

The expansion sleeve, which can best be slit from its bore interior in a manner known in itself, is preferably preinstalled nonrotatably on the hardware that is to be affixed.

In that case the expansion sleeve is preferably injection-molded from plastic, so that at its end adjacent the hardware a larger flange plate can be made integral with it and can be fitted into a matching rebate in the hardware device.

Alternatively the expansion sleeve can be made out of metal.

The arrangements for varying the position of the conical sections of the shaft of the expander and of the complementary conical sections of the central bore of the expansion sleeve by rotating the expander have, in an advantageous embodiment of the invention, at least one ramp surface on the expander concentric with the central axis of the shaft of the expander, which thrusts against a complementary ramp surface fixed on the hardware device.

In a preferred embodiment of the invention, the conically tapering expansion sections of the shaft of the expander are provided not directly adjoining one another on the shaft of the expander, but are joined to one another through a transition tapering conically in the opposite direction, and the cone angle included by the generatrices of these conical transitions is greater than that of the adjoining expansion sections. These transitions with their taper opposite that of the expansion sections make it possible to install the expander simply by pressing its shaft into the central bore of the expansion sleeve without the need to fear damage to the internal contour of the central bore by the sharp edges of the bases of the expansion sections.

In a preferred embodiment of the invention, the conically tapering expansion sections, as well as the transitions if desired, are formed by at least a portion of a helical surface surrounding the shaft over at least a portion of its length. The sections of the helical surfaces forming the expansion sections and the associated complementary sections of the central bore of the expansion sleeve thus form the ramp surfaces which slide on one another when the expander is rotated.

It is expedient to bring the shaft of the expander out of the expansion sleeve at the bore-interior end and to secure it against extraction from the central bore by means of a disk provided at the free end in front of the end of the expansion sleeve.

On the expander on the one hand and on the plug or hardware on the other it is expedient to provide interacting abutments which limit the rotation of the expander relative to the expansion sleeve to an angle of less than 360°. If the pitch of the helical surface and the taper of the expansion sections are appropriately selected, a rotation of less than 360° will suffice to force the expansion sleeve to press against the bore wall with the necessary force.

At the drive end of the shaft of the expander it is desirable to provide a head of larger diameter than the shaft and resting on the surface of the hardware device, with means for rotating the expander; the abutment provided on the expander to limit the angle of rotation is, for example, formed on a projection extending radially from the head, with which there is associated a projection protruding from the upper surface of the hardware device as a counter abutment. The means for rotating the expander are most simply in the form of a slot serving for engagement of a screwdriver, or a cross slot or a recess suitable for engagement by a hexagonal wrench.

In a modified embodiment of the invention the conically tapering expansion sections, as well as the transitional sections if desired, are formed by a succession of truncoconical sections along the length of the expander. Since these expansion sections do not produce any axial displacement component relative to the expansion sleeve when rotated, the inclined ramp surface or surfaces of the expander will then be provided on the bottom of a head provided at the bore-external end of the shaft of the expander and having a greater diameter than the shaft, and provided again with means for rotating the expander.

The ramp surface or surfaces cooperating with those of the expander are then provided on the upper side of a disk disposed nonrotationally on the hardware device beneath the head of the expander. There will be no need for such a separate disk provided with the ramp surface or surfaces if the ramp surface or surfaces are formed on the upper side of the hardware device itself, confronting the head of the expander.

BRIEF DESCRIPTION OF THE DRAWINGS

The invention will be explained in the description that follows of two embodiments in conjunction with the drawings, wherein.

DETAILED DESCRIPTION

Figure 1:
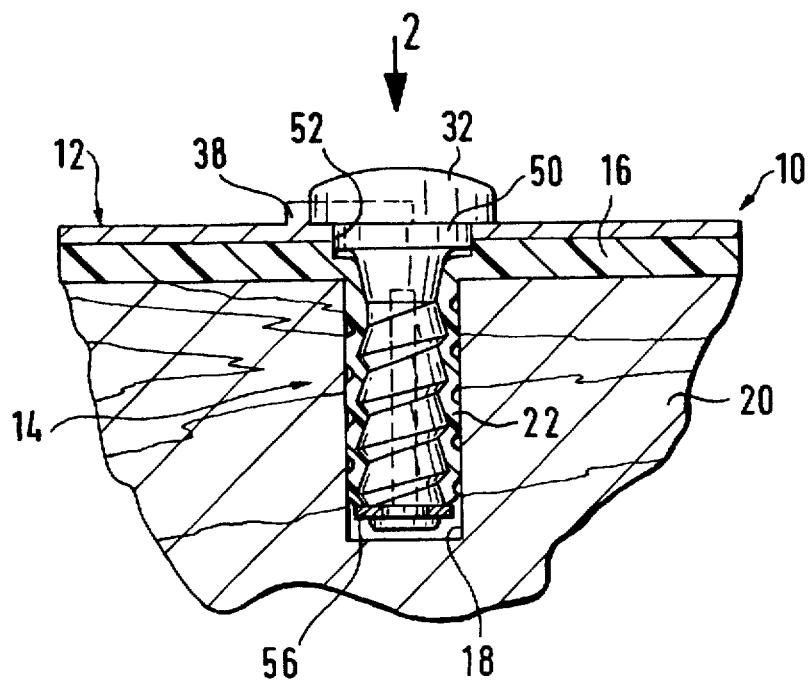
FIG. 1 is a first embodiment of a fastening system according to the invention, seen in section in the direction of the arrows 1—1 in FIG. 2.
Figure 3:
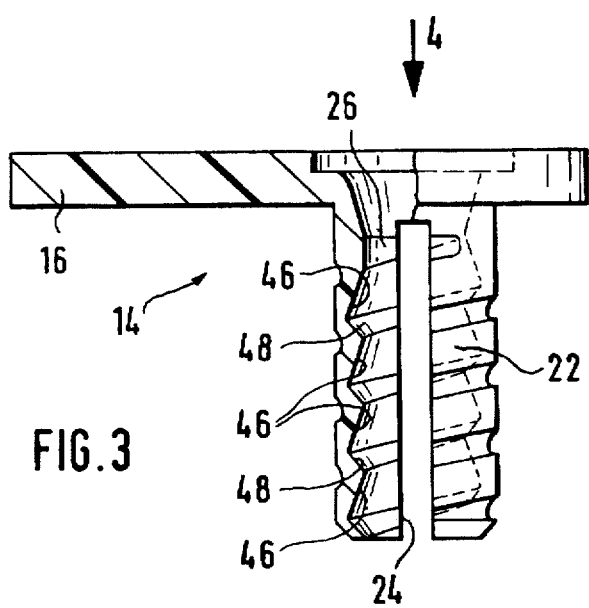
FIG. 3 is a side view of the spreading sleeve, partially in section, with an integrally injection-molded flange plate of the embodiment shown in FIGS. 1 and 2, the section being indicated in FIG. 4 by the arrows 3—3.
Figure 5:
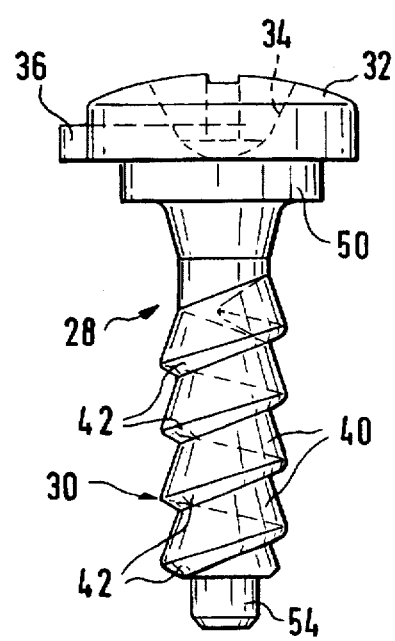
FIG. 5 is a side elevation of the driver of the embodiment shown in FIGS. 1 and 2.
Figure 4:
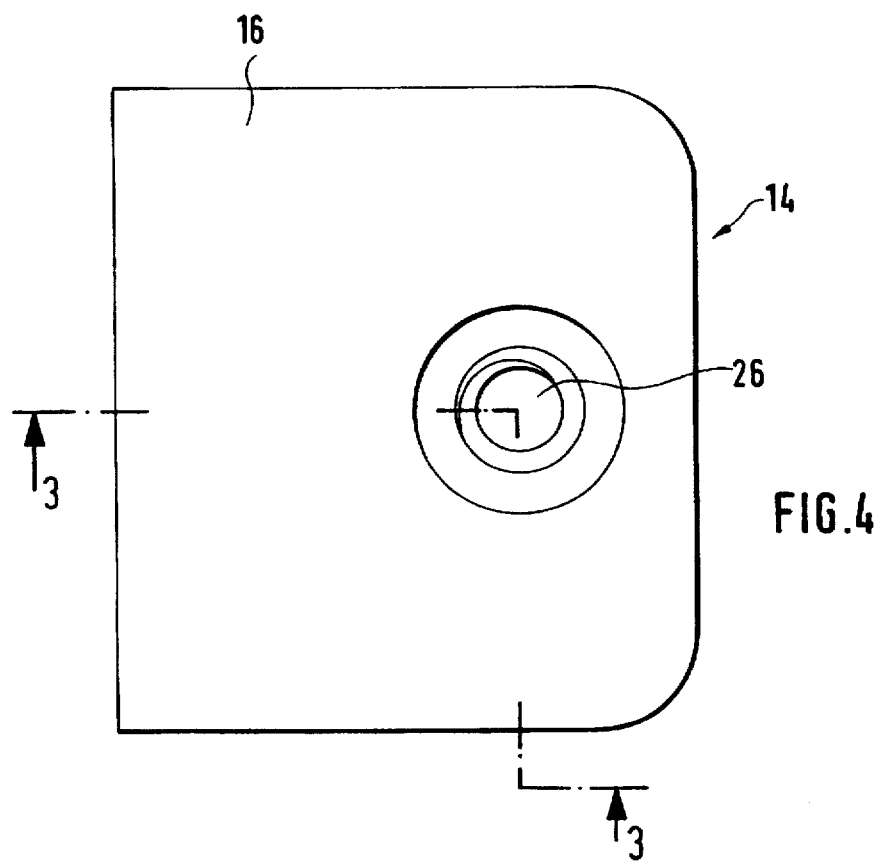
FIG. 4 is a top plan view seen in the direction of arrow 4 in FIG. 3.

In the fastening system represented in FIG. 1 and identified as a whole by 10, a cabinet hardware device 12, of which only a portion is shown in the form of a thin piece of sheet metal, is fastened by means of a plug 14, which has a flange plate 16 lying beneath the device 12, in a bore 18 in a cabinet wall 20. The plug 14 with the flange plate 16 is made up of two components which are also represented separately in FIGS. 3, 4 and 5.

The plug itself, which is to be affixed in the bore 18, is formed by a relatively thin-walled expansion sleeve 22 of plastic, which, like common expansion plugs, is divided into two halves by slits 24 made in its open end. The flange plate 16, molded in one piece with the upper, unslitted end of the expansion sleeve 22, is shaped so that it can be inserted into a correspondingly shaped shallow recess in the device 12, for holding the expansion sleeve against rotation in the hardware device 12. Into the central bore 26 in the expansion sleeve there is inserted an expander 28 composed of an elongated shaft 30 and a head 32 provided on its upper end, which contains a recess in the form of the cross slot 34 represented in FIG. 2 for a driving tool.

On the head 32 there is provided a lug 36 projecting radially therefrom, which in conjunction with a projection 38 formed on the upper side of the hardware device limits the angle of rotation of the expander 28 relative to the expansion sleeve 22 to, say, 270° in this particular case. Over the greater portion of its length, the shaft 30 of the expander 28 inserted into the expansion sleeve 22 is provided with sections 40 which combine to form a helical surface and which taper conically toward the head 32. The conically tapering sections 40 are connected together by tapering transitions 42 which in turn also combine to form a helical surface. The tapering sections and transitions combining to form the helical surface simulate a screw thread on the shaft 30, but the flanks of the tapering sections include with the central axis of the shaft a definitely lower angle of a magnitude of about 20°, than the oppositely inclined transitions in which the angle they form with the central axis might amount to about 45°. Moreover, the pitch of the helical surface is made relatively great, so that in the case of the rotation of the expander 28 a sufficient pulling component in the direction of the axis of the expander will be produced.

The through-bore 26 of the sleeve 22 is configured complementary to the shaft 30 of the expander 28, i.e., conically tapering bore sections 46 are associated with the tapering sections 40, and complementary conical sections 48 of the central bore are associated with the transitions 42. It is evident that, when the head 32 of the expander 28 is rotated clockwise (with reference to FIG. 2), the tapering sections 40 will change their position relative to the complementary central bore sections 46 such that the result will be an expansion of the plug 14, the sleeve being expanded not only at one end but virtually over its entire length by the sections 46 complementary to the tapering sections 40, so that, in other words, the sleeve 22 will be forced, with a pressure uniform over most of its length, against the wall of the bore 18. The cylindrical portion 50 provided in FIGS. 1 and 5 under the actual head 32 of the expander 28 centers the latter in a bore 52 in the hardware device 12. The end 54 protruding, in FIG. 5, from the end of the shaft 30 serves to hold a disk 56 riveted thereon, which prevents the expander 28 from being drawn out of the bore 26 of the expansion sleeve and thus lost.

Figure 2:
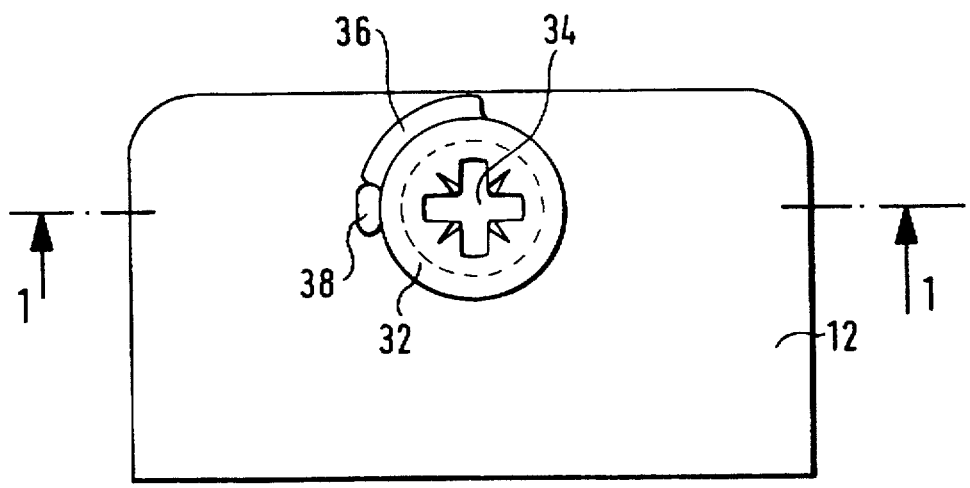
FIG. 2 is a top view of the fastening system, seen in the direction of arrow 2 in FIG. 1.

FIGS. 6 to 9 show components of a fastening system 10 whose operation is similar to that of FIGS. 1 and 2 and in which slight modifications are made. To avoid unnecessary repetition, only the relevant modifications of the components will be referred to, since the same reference numbers are associated with all of the functionally equal parts in the drawings.

Figure 6:
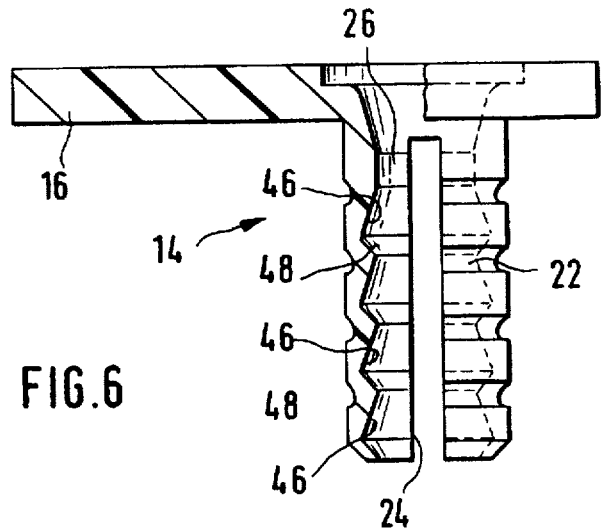
FIG. 6 is a view of an embodiment represented in the same manner as FIG. 3 of a modified embodiment of a spreading sleeve with an integral flange plate.
Figure 7:
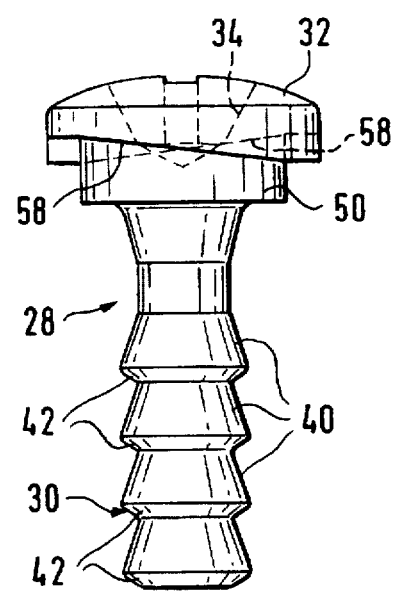
FIG. 7 is a side view of the corresponding modified driver.

One important difference from the embodiment previously described can be seen in FIGS. 6 and 7. It can be seen that the conically tapering expander areas 40 and the transitional sections 42 of the expander 28 are not on a common helical surface of the shaft 30, but are formed by a succession of separate truncoconical sections along the length of the shaft. Accordingly, in the central bore 26 of the expansion sleeve 22 the sections 46 that correspond to the sections 40 and the transitional sections 48 that correspond to the transitional sections 42 are also of a complementary truncoconical shape.

Figure 8:
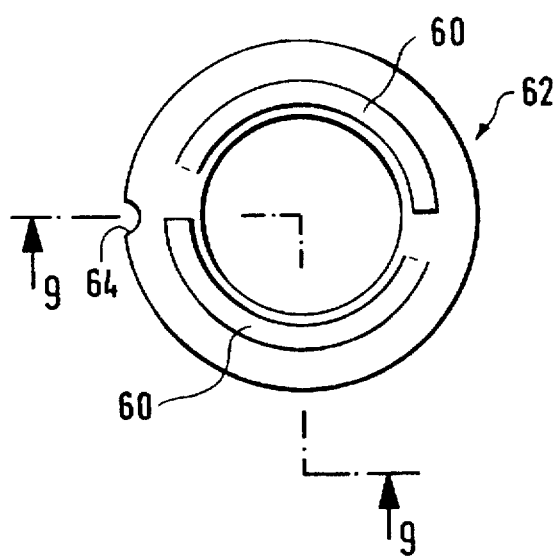
FIG. 8 is a top plan view of a washer to be provided additionally under the bead of the driver.
Figure 9:
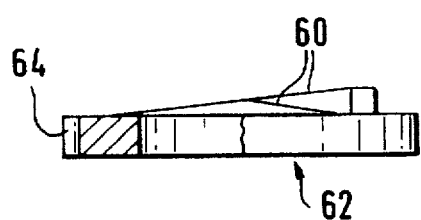
FIG. 9 is a view of the washer in a section indicated by the arrows 9—9 in FIG. 8.

To achieve the expansion of the sleeve 22 in this configuration, the shaft 30 of the expander 28 must be displaced relative to the expansion sleeve in the direction of its head 32. To make this possible, circumferentially sloping ramp surfaces 58 independent of the shape of the expander areas 40 are incorporated into the underside of the head 32, and complementary ramps 60 are provided on the upper surface, facing the head, of a disk to be disposed under the head 32 on the hardware device 12 (FIGS. 8 and 9). In the case represented, two such complementary ramp surfaces 58 and 60 are provided, each extending over slightly less than 180°. The pitch of the ramp surfaces 58 and 60 and the conicity of the expander sections 40 are therefore matched to one another such that the expander sleeve 22 will be expanded by the necessary amount by turning the head 32 of the expander 28 by less than 180°, e.g., 170°. Abutments (not shown) can be provided on the disk 62 and on the head 32 to limit the turning angle of the head 32 relative to the disk 62. Rotation of the disk 62 with the head 32 while the sleeve 22 is being expanded is prevented in this case by a notch 64 in the outer margin of the disk 62, which is engaged by a projection (not shown) protruding from the hardware device 12.

The pre-installation of the fastening system 14 on the hardware device 1 is performed in the two above-described embodiments such that the plastic component consisting of the expansion sleeve 22 and the flange plate 16 integral therewith is guided into a recess on the underside of the hardware device 12 so that the bore 52 provided in the hardware device 12 is in line with the open central bore 26 of the expansion sleeve 22. Then the shaft 30 of the expander 28 is pressed through the bore 52 and into the central bore 26 until the cylindrical intermediate section 50 underneath the head 32 occupies the bore 52. As this is done, the expansion sleeve stretches outward and then snaps back again as each expansion section 40 passes into the next one, this stretching being facilitated by the transitions 42 with the taper opposite that of the expansion sections. The disk 56 is then placed on the projection 54 protruding from the bottom of the expansion sleeve, and riveted by means of the material of the projection. Withdrawal of the expander 28 from the sleeve is then no longer possible.

In the embodiment last described, with truncoconical spreading sections 40, before the spreader 28 is inserted into the bore 52 in the hardware device and then into the central bore 26 of the spreader sleeve, the disk 62 is placed on the hardware device 12 so that the notch 64 in the disk 62 is engaged by the above-mentioned projection on the hardware device 12. Then the expander 28 is driven in the same as in the first embodiment, to such an extent that the underside of the head 32 is in contact with the top side of the disk 62, the relative rotational position of the head 32 and disk 62 being selected such that the ramp surfaces 58 and 60 will contact one another in the rotational position corresponding to the unexpanded sleeve 22.

It can be seen that modifications and further developments of the embodiments described can be achieved in the scope of the invention, relating also to the special configuration of the expansion sleeve. The relatively thin-walled expansion sleeve in the embodiments represented can also have a greater wall thickness, and can have the circumferential ridges of saw-tooth like configuration often provided, which during the expansion operation will additionally dig into the material of the wall of the mounting bore. In addition to the applications as fastening means for mounting plates or recessed boxes of hinges, their use is contemplated in connection with other hardware, such as connecting hardware or construction hardware for shelves or panels.

What is claimed is:

1. A fastening device for mounting hardware, especially cabinet hardware, on a surface, comprising:

an expander having an elongated shaft, an expansion plug, which is introducible into a bore, said plug having an expansion sleeve for receiving the elongated shaft of said expander, said expander having an integrally fixed head on an end protruding from the expansion sleeve for rotating the expander radially relative to the expansion sleeve, wherein, the elongated shaft of the expander comprises a number of expansion sections provided successively lengthwise and tapering conically in a direction toward the end protruding from the expansion sleeve, the expansion sleeve comprises a central opening for receiving the elongated shaft of the expander and is of a shape complementary to the shaft of the expander, means are provided for axially varying the position of the complementary, conically tapering expansion sections of the shaft relative to complementarily conical central opening sections in the expansion sleeve upon a radial rotation of the expander relative to the expansion sleeve, and a disk provided at a free end of the expansion sleeve and projecting radially beyond an end face of the sleeve wherein the expansion sleeve further comprises means for enabling the expansion sleeve to be preinstallable non-rotatably on the hardware device to be mounted.

2. The fastening device according to claim 1, wherein the expansion sleeve is slit in a known manner from its bore-interior end.

3. The fastening device according to claim 1, wherein the expansion sleeve is a piece injection-molded from plastic.

4. The fastening device according to claim 3, wherein the hardware end of the expansion sleeve further comprises an integrally molded flange plate receivable in a matched recess in the fastening surface of the hardware device to be mounted.

5. The fastening device according to claim 1, wherein the expansion sleeve is made of metal.

6. The fastening device according to claim 1, wherein the conically tapering expansion sections of the shaft of the expander are connected to one another by a transition section tapering conically in the opposite direction, and that the cone angle enclosed by generatrices of the conical transitions is greater than the cone angle of each adjoining expansion section.

* * * * *